US008941730B2

(12) United States Patent
Nagamine et al.

(10) Patent No.: US 8,941,730 B2
(45) Date of Patent: Jan. 27, 2015

(54) COLOR-UNEVENNESS INSPECTION APPARATUS AND METHOD

(75) Inventors: Kunihiko Nagamine, Kanagawa (JP); Satoshi Tomioka, Kanagawa (JP)

(73) Assignee: Sony Corporation, Tokyo (JP)

(*) Notice: Subject to any disclaimer, the term of this patent is extended or adjusted under 35 U.S.C. 154(b) by 239 days.

(21) Appl. No.: 13/033,417

(22) Filed: Feb. 23, 2011

(65) Prior Publication Data

US 2011/0216189 A1    Sep. 8, 2011

(30) Foreign Application Priority Data

Mar. 3, 2010    (JP) ................. 2010-046779

(51) Int. Cl.
*H04N 7/18*    (2006.01)
*G06T 7/00*    (2006.01)
(52) U.S. Cl.
CPC ... *G06T 7/00* (2013.01); *H04N 7/18* (2013.01)
USPC ........... 348/135; 348/744; 345/589; 345/590; 345/604; 345/690; 358/1.9; 358/518; 358/520; 382/162; 382/164; 382/165; 382/167; 382/275
(58) Field of Classification Search
CPC ................. H04N 17/00; G09G 3/006; G09G 2320/0693; G09G 2320/0242; G01J 3/46; G01J 3/506; G01J 3/462; G01J 3/465
USPC .................... 348/135, 744; 358/518; 382/164
IPC ........................................................ H04N 7/18
See application file for complete search history.

(56) References Cited

U.S. PATENT DOCUMENTS

| 4,963,828 | A   | * | 10/1990 | Kawame et al. | ............... | 324/404 |
| 5,173,769 | A   |   | 12/1992 | Hashimoto |  |  |
| 2002/0097395 | A1 | * | 7/2002 | Smith et al. | ................. | 356/239.2 |
| 2006/0250670 | A1 | * | 11/2006 | Tsukioka | ....................... | 358/518 |
| 2007/0076277 | A1 | * | 4/2007 | Miyawaki et al. | ............. | 358/520 |
| 2007/0110304 | A1 | * | 5/2007 | Tsukada | ........................ | 382/167 |
| 2007/0183656 | A1 | * | 8/2007 | Kuwahara et al. | ............. | 382/162 |

(Continued)

FOREIGN PATENT DOCUMENTS

JP    01-225296    9/1989
JP    03-101583    4/1991

(Continued)

*Primary Examiner* — Jayanti K Patel
*Assistant Examiner* — Neil Mikeska
(74) *Attorney, Agent, or Firm* — Wolf, Greenfield & Sacks, P.C.

(57) ABSTRACT

A color-unevenness inspection apparatus includes: an image pickup section picking up an image of an inspection target in a color-unevenness inspection; and an image generation section generating an uneven-color image by, in the picked-up image of the inspection target obtained by the image pickup section, calculating a chroma in each unit region and identifying an uneven-color region based on a magnitude of the calculated chroma. The color-unevenness inspection apparatus further includes: a calculation section calculating, for the uneven-color region in the uneven-color image, an evaluation parameter to be used in the color-unevenness inspection; and an inspection section performing the color-unevenness inspection based on the calculated evaluation parameter. The image generation section calculates the chroma, in each unit region of the picked-up image, while performing correction processing that reflects variations in color-unevenness visibility from color to color.

5 Claims, 9 Drawing Sheets

(56) References Cited

U.S. PATENT DOCUMENTS

| | | | |
|---|---|---|---|
| 2009/0096938 A1* | 4/2009 | Ouchi | 348/744 |
| 2010/0158359 A1* | 6/2010 | Qiao | 382/164 |
| 2012/0294522 A1 | 11/2012 | Ueda et al. | |

FOREIGN PATENT DOCUMENTS

| | | |
|---|---|---|
| JP | 03-291093 | 12/1991 |
| JP | 10-096681 | 4/1998 |

\* cited by examiner

COLOR-UNEVENNESS INSPECTION APPARATUS AND METHOD

BACKGROUND OF THE INVENTION

1. Field of the Invention

The present invention relates to a color-unevenness inspection apparatus and method in which color unevenness of a color image or the like is inspected.

2. Description of the Related Art

Previously, for a color-unevenness inspection in a mass-production process for a display device that uses a Cathode Ray Tube (CRT), a Liquid Crystal Display (LCD) or the like capable of displaying a color image, a sensory test based on a comparison with a boundary sample has been mainly performed. This technique is carried out such that a display screen of the display device targeted for the inspection is directly viewed by a human being and therefore, this is an inspection close to actual use and also a simple and easy technique.

However, this technique relies largely upon the capabilities of individual inspectors and thus, quality of inspection varies depending on factors such as variations among the individual inspectors and the inspector's degree of fatigue. Therefore, it is difficult to perform a stable inspection.

Under the circumstances, there have been proposed some techniques of objectively inspecting color unevenness without depending on the capability of the inspector. For example, there is a technique of inspecting color unevenness, by measuring a hue in each of plural points within a display screen by using a color imaging device or the like, in a state in which the entire display screen is set at white display. In this technique, the color unevenness is inspected according to the magnitude of a value representing a maximum color difference ($\Delta Euv^*$ or $\Delta Eab^*$) between a result of the measurement and a white display portion.

Specifically, for example, in Japanese Unexamined Patent Application Publications No. 01-225296, No. 03-101583 and No. 03-291093, a color and brightness at each of plural points within a display screen are measured, and the dispersion, a difference between a maximum value and a minimum value, and the like are standardized and used for a color-unevenness inspection. Further, for instance, in Japanese Unexamined Patent Application Publication No. 10-96681, attention is focused on the spatial size of an uneven color region and a region where a color is changed, and these are quantified and used for a color-unevenness inspection.

SUMMARY OF THE INVENTION

However, in the techniques of the above-described Japanese Unexamined Patent Application Publications No. 01-225296, No. 03-101583 and No. 03-291093, although a stable inspection can be expected by the objective color-unevenness inspection using the standardized parameters, there is such a problem that the degree of color unevenness felt by a human being also changes according to how the color unevenness spreads. In addition, similarly, in the technique of the above-described Japanese Unexamined Patent Application Publication No. 10-96681 as well, there is such a problem that the degree of color unevenness felt by a human being changes depending on the hue.

In other words, according to the techniques of the past, it is difficult to perform an appropriate color-unevenness inspection because human's color-unevenness visibility varies depending on the color and thus, there is room for improvement.

In view of the foregoing, it is desirable to provide a color-unevenness inspection apparatus and method capable of performing a color-unevenness inspection more appropriate than the techniques of the past.

According to an embodiment of the present invention, there is provided a color-unevenness inspection apparatus that includes: an image pickup section picking up an image of an inspection target in a color-unevenness inspection; an image generation section generating an uneven-color image by, in the picked-up image of the inspection target obtained by the image pickup section, calculating a chroma in each unit region and identifying an uneven-color region based on the magnitude of the calculated chroma; a calculation section calculating, for the uneven-color region in the uneven-color image, an evaluation parameter to be used in the color-unevenness inspection; and an inspection section performing the color-unevenness inspection based on the calculated evaluation parameter. The image generation section calculates the chroma, in each unit region of the picked-up image, while performing correction processing that reflects variations in color-unevenness visibility from color to color. Incidentally, as the "evaluation parameter", there are, for example, "an uneven-color area ratio" that is an area ratio of an uneven-color region to the entire region of the inspection target, and "a maximum chroma" in the entire region of the uneven-color region.

According to another embodiment of the present invention, there is provided a color-unevenness inspection method that includes steps of: obtaining a picked-up image of an inspection target in a color-unevenness inspection; generating an uneven-color image by, in the picked-up image, calculating a chroma in each unit region and identifying an uneven-color region based on the magnitude of the calculated chroma; calculating, for the uneven-color region in the uneven-color image, an evaluation parameter to be used in the color-unevenness inspection; and performing the color-unevenness inspection based on the calculated evaluation parameter. In the step of generating the uneven-color image, the chroma is calculated, in each unit region of the picked-up image, while correction processing that reflects variations in color-unevenness visibility from color to color is performed.

According to the color-unevenness inspection apparatus and the color-unevenness inspection method in the embodiments of the present invention, the uneven-color image is generated by, in the picked-up image of the inspection target in the color-unevenness inspection, calculating the chroma in each unit region and identifying the uneven-color region based on the magnitude of the calculated chroma. Further, the evaluation parameter for the uneven-color region in this uneven-color image is calculated, and the color-unevenness inspection is performed based on this evaluation parameter. Here, when the uneven-color image is generated, in each unit region of the picked-up image, the chroma is calculated, while the correction processing that reflects variations in color-unevenness visibility from color to color is performed. Therefore, there is realized an objective color-unevenness inspection that more closely matches a sense of a human being, as compared to a case of the past in which a color-unevenness inspection is performed without reflecting variations in color-unevenness visibility from color to color.

According to the color-unevenness inspection apparatus and the color-unevenness inspection method in the embodiments of the present invention, when the uneven-color image is generated by, in the picked-up image of the inspection target in the color-unevenness inspection, calculating the chroma in each unit region and identifying the uneven-color region based on the magnitude of the calculated chroma, the chroma is calculated, while the correction processing that reflects variations in color-unevenness visibility from color to color is performed, in each unit region of the picked-up image. Therefore, there is realized an objective color-unevenness inspection that more closely matches a sense of a human being than that in the past. Accordingly, it is possible to perform a color-unevenness inspection more appropriate than that in the past.

DETAILED DESCRIPTION OF THE PREFERRED EMBODIMENT

An embodiment of the present invention will be described below in detail with reference to the drawings. Incidentally, the description will be provided in the following order.
1. Embodiment (an example of color-unevenness inspection processing in which a chroma is calculated while correction processing that reflects variations in color-unevenness visibility is performed, and an inspection is performed based on this chroma)
2. Modification <1. Embodiment>

[Structure of Color-unevenness Inspection Apparatus]

Figure 1:
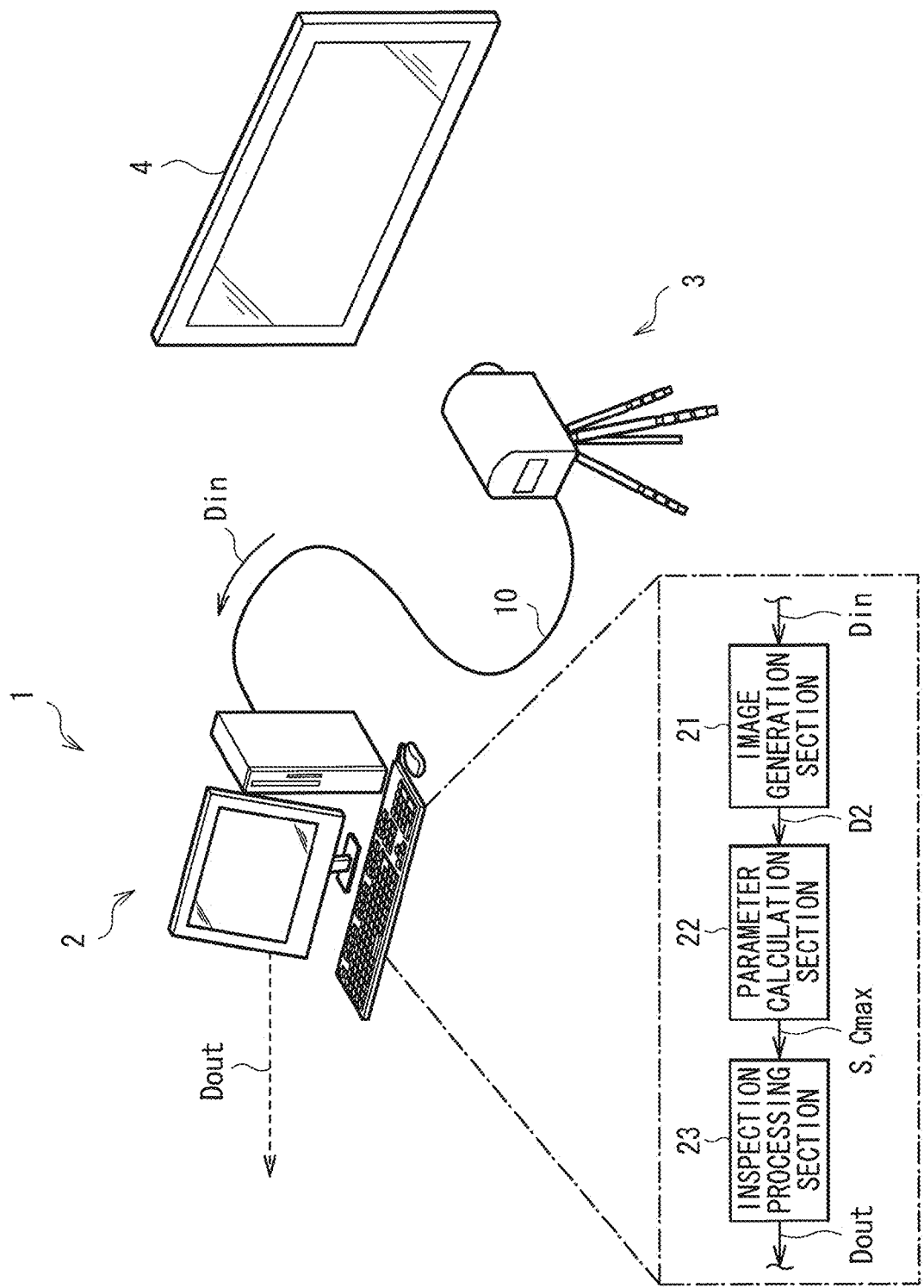
FIG. 1 is a diagram illustrating a schematic structure of a color-unevenness inspection apparatus according to an embodiment of the present invention, together with a display device serving as an inspection target.

FIG. 1 illustrates a schematic structure of a color-unevenness inspection apparatus (color-unevenness inspection apparatus 1) according to an embodiment of the present invention, together with a display device 4 serving as an inspection target. This color-unevenness inspection apparatus 1 performs an inspection of color unevenness on a color image displayed in the display device 4 or the like, and includes an image processing device 2 and an image pickup device 3 (image pickup section). Here, as the display device 4, various types of displays such as a CRT, an LCD, a Plasma Display Panel (PDP) and an organic Electro Luminescence (EL) display can be applied. Incidentally, a color-unevenness inspection method according to an embodiment of the present invention is realized in the color-unevenness inspection apparatus 1 of the present embodiment and therefore, they will be described together as follows.

(Image Pickup Device 3)

The image pickup device 3 is used to pick up an image of a display screen (color display screen) of the display device 4 serving as an inspection target in a color-unevenness inspection. The image pickup device 3 includes an image sensor formed by, for example, Charge Coupled Devices (CCDs), a Complementary Metal Oxide Semiconductor (CMOS), or the like. A picked-up image (picked-up-image data Din) obtained through the image pickup by the image pickup device 3 is output to the image processing device 2 via a connection wire 10. Incidentally, FIG. 1 illustrates a case where the connection wire 10 that is a cable is used, but the image pickup device 3 and the image processing device 2 may be wirelessly connected to each other.

(Image Processing Device 2)

The image processing device 2 performs the color-unevenness inspection based on the picked-up-image data Din output from the image pickup device 3, and outputs inspection result data Dout as a result of the inspection. The image processing device 2 is configured by using, for example, a Personal Computer (PC) as illustrated in FIG. 1, and the like. The image processing device 2 includes an image generation section 21, a parameter calculation section (calculation section) 22 and an inspection processing section (inspection section) 23.

The image generation section 21 performs predetermined image processing based on the picked-up-image data Din, thereby generating an uneven-color image (uneven-color image data D2) that will be described later. Specifically, in the picked-up image configured based on the picked-up-image data Din, a chroma C in each unit region (here, each display pixel) is calculated, and an uneven-color region is identified based on the magnitude of the chroma C, so that the uneven-color image data D2 is generated. At the time, the image generation section 21 calculates, in each display pixel of the picked-up image, the chroma C while performing correction processing that reflects variations in color-unevenness visibility from color to color. Incidentally, the image processing (image generation processing) in this image generation section 21 will be described later in detail.

The parameter calculation section 22 calculates, for the uneven-color region in the uneven-color image (uneven-color image data D2) generated by the image generation section, each of an uneven-color area ratio S and a maximum chroma Cmax, which are specific examples of an evaluation parameter in a color-unevenness inspection to be described later. Incidentally, calculation processing in this parameter calculation section 22 will also be described later in detail.

Based on the uneven-color area ratio S and the maximum chroma Cmax output from the parameter calculation section 22, the inspection processing section 23 performs the color-unevenness inspection for the display screen of the display device 4 serving as the inspection target, and outputs inspection result data Dout as a result of the inspection. Specifically, for example, based on a color-unevenness comprehensive evaluation value E (comprehensive evaluation value) obtained through weighting and addition of the uneven-color area ratio S and the maximum chroma Cmax, the inspection processing section 23 performs the color-unevenness inspection. Incidentally, color-unevenness inspection processing in the inspection processing section 23 will also be described later in detail.

[Actions and Effects of Color-unevenness Inspection Apparatus]

Subsequently, actions and effects of the color-unevenness inspection apparatus 1 according to the present embodiment will be described.

(Basic Operation)

In the color-unevenness inspection apparatus 1, when the display screen of the display device 4 is imaged by the image pickup device 3, a picked-up image (picked-up-image data Din) is obtained. This picked-up-image data Din is input into the image generation section 21 in the image processing device 2 via the connection wire 10.

In the picked-up image configured based on the picked-up-image data Din, the image generation section 21 calculates the chroma C in each display pixel, and identifies the uneven-color region based on the magnitude of the chroma C, thereby generating the uneven-color image data D2. Subsequently, the parameter calculation section 22 calculates each of the uneven-color area ratio S and the maximum chroma Cmax, for the uneven-color region in this uneven-color image data D2. And then, based on these uneven-color area ratio S and maximum chroma Cmax, the inspection processing section 23 performs the color-unevenness inspection for the display screen of the display device 4 serving as the inspection target. The inspection result data Dout is output by the inspection processing section 23 as a result of the inspection.

(Details of Color-Unevenness Inspection Processing)

Figure 2:
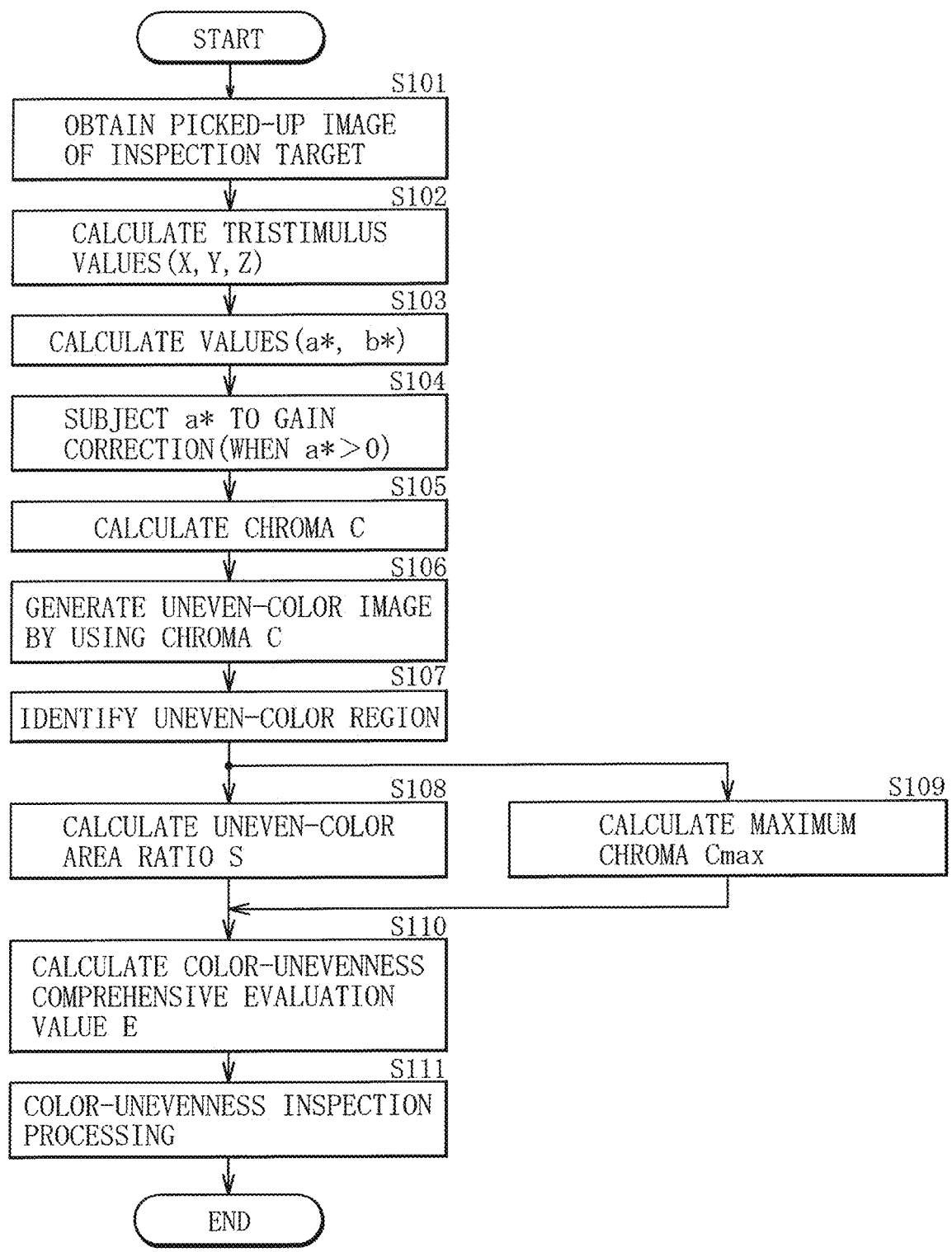
FIG. 2 is a flowchart representing an example of color-unevenness inspection processing performed in the image processing device illustrated in FIG. 1.

Next, there will be described details of the color-unevenness inspection processing by the image processing device 2, which is one of features of the color-unevenness inspection apparatus 1 in the present embodiment. FIG. 2 illustrates an example of the color-unevenness inspection processing performed in the image processing device 2, in the form of a flowchart.

First, as mentioned above, the image generation section 21 obtains the picked-up image (picked-up-image data Din) of the inspection target from the image pickup device 3 via the connection wire 10 (step S101).

Subsequently, the image generation section 21 converts a signal of the picked-up-image data Din into a signal (Xi, Yi, Zi) formed by tristimulus values X, Y, and Z (step S102). Specifically, for example, when the picked-up-image data Din is a video signal in sRGB standard, conversion is performed by using the following equation (1). Further, when the picked-up-image data Din is a video signal in other standard, the signal (Xi, Yi, Zi) is generated by similarly performing conversion in accordance with such a standard. Incidentally, although the case where the signal of the picked-up-image data Din is converted into the signal (Xi, Yi, Zi) is described here, the signal (Xi, Yi, Zi) may be directly obtained by the image pickup device 3.

When picked-up-image data Din is in sRGB standard (based on IEC 61966-2-1).

$$\begin{bmatrix} X_i \\ Y_i \\ Z_i \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_{sRGB} \\ G_{sRGB} \\ B_{sRGB} \end{bmatrix} \quad (1)$$

Next, based on this signal (Xi, Yi, Zi), the image generation section 21 calculates values (a*, b*) in the CIE 1976 L*a*b* color space (CIELAB color space) recommended by the Commission International de l'Eclairage (CIE) in 1976 (step S103). Incidentally, this CIELAB color space is recommended as a uniform color space and is a space in consideration of uniformity with respect to human's visual perception of colors. Here, specifically, the image generation section 21 calculates the values (a*, b*) by using the following equations (2) and (3), per display pixel. Incidentally, Xn, Yn and Zn in these equations are tristimulus values of a perfect reflecting diffuser that targets D65.

$$\begin{cases} a^* = 500\{(X_i/X_n)^{1/3} - (Y_i/Y_n)^{1/3}\} & (2) \\ b^* = 200\{(Y_i/Y_n)^{1/3} - (Z_i/Z_n)^{1/3}\} & (3) \end{cases}$$

Next, in each display pixel, the image generation section 21 calculates a chroma C while performing the correction processing that reflects variations in color-unevenness visibility from color to color. Specifically, first, the value "a*" calculated at step S103 is subjected to gain correction processing (correction processing that employs a gain α) expressed by the following equation (4), as the correction processing that reflects variations in color-unevenness visibility (step S104). Subsequently, by using the values (a*, b*) calculated at step S103, the image generation section 21 calculates the chroma C for each display pixel, based on the following equation (5) (step S105).

$$a^{*'} = (\alpha \times a^*) \quad (4)$$
(when $a^* > 0$: gain $\alpha > 1$, when $a^* \le 0$: gain $\alpha = 1$)

$$C = \{(a^{*'})^2 + (b^*)^2\}^{1/2} \quad (5)$$
$$= \{(\alpha \times a^*)^2 + (b^*)^2\}^{1/2}$$

Figure 3:
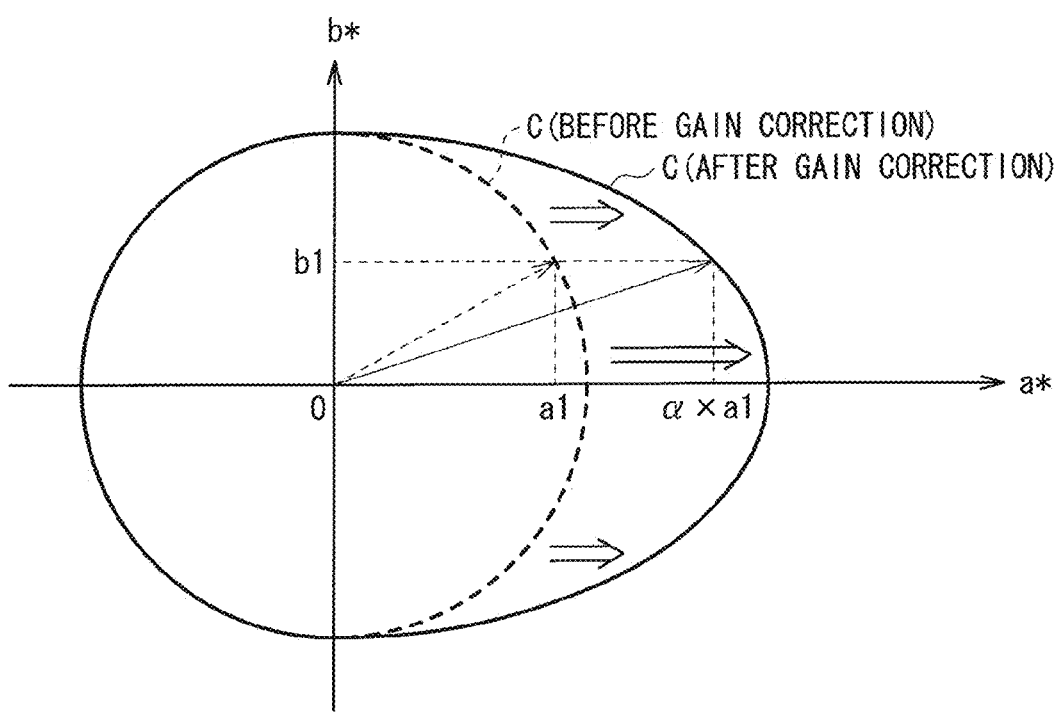
FIG. 3 is a characteristic diagram illustrating an example of a technique of calculating a chroma in FIG. 2.

Specifically, this corresponds to, when, for example, a coordinate system (a*, b*) as illustrated in FIG. 3 is considered, conversion (correction) of a point (a*, b*)=(a1, b1) into a point (a*, b*)=(α×a1, b1). This results in curves indicating the chromas C before and after the gain correction processing as illustrated in FIG. 3. In other words, the curve indicating the chroma C before the gain correction processing is circular, whereas the curve indicating the chroma C after the gain correction processing is oval instead of being circular, in a region of a*>0, as indicated by arrows in the figure.

Here, the reason that the chroma C is calculated after the gain correction processing is performed is that the visibility of color unevenness felt by a human being (color-unevenness visibility) varies depending on the types of colors forming the color unevenness.

Figure 4A:
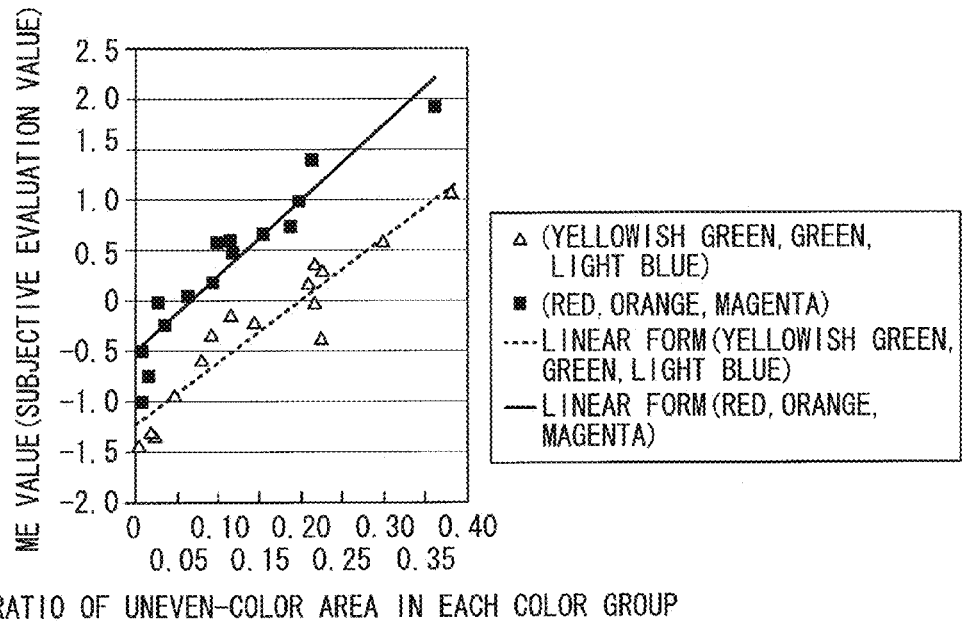
FIG. 4A and FIG. 4B are a characteristic diagram that represents an example of the relation between an area ratio of an uneven-color region and a subjective evaluation value of color unevenness per color group, and a characteristic diagram representing an example of the relation between a maximum chroma in the uneven-color region and the subjective evaluation value of color unevenness per color group, respectively.

Specifically, at first, the levels of color-unevenness visibility (ME value: subjective evaluation value of color unevenness perceived by a human being) vary by the area ratio of the uneven-color region for each color group (the area ratio of the uneven-color region for each color group to the entire region of the inspection target (all the display pixel regions within the display screen)). In other words, as illustrated in FIG. 4A, in each of the area ratios in a color group corresponding to red (R)-based, orange (O)-based and magenta (M)-based colors, the ME value (color-unevenness visibility) is higher than the ME value in each of the area ratios in a color group corresponding to yellowish-green (YG)-based, green (G)-based and light-blue (LB)-based colors, when the values representing the respective area ratios are the same.

Figure 4B:
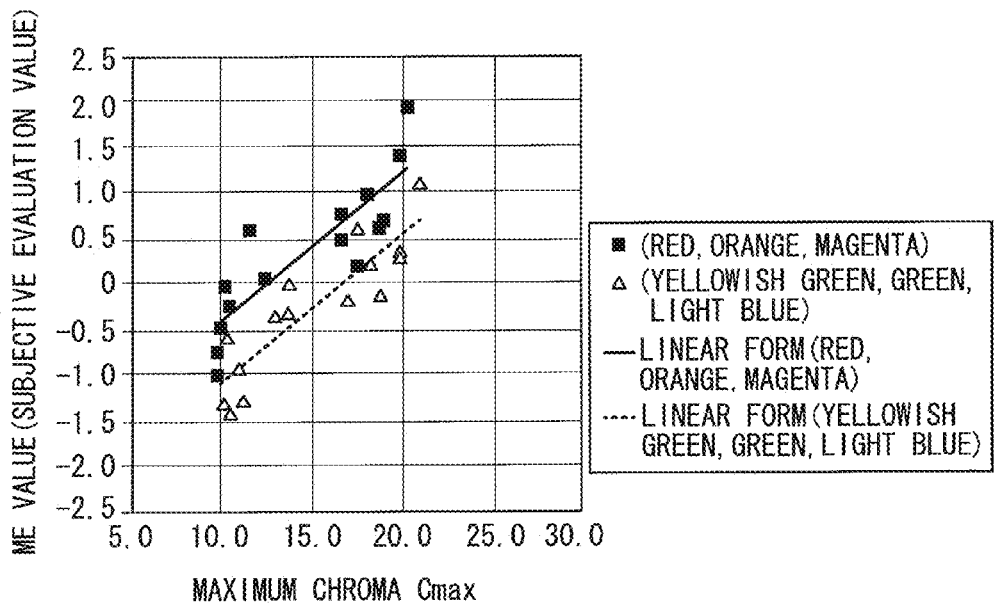

In addition, the levels of color-unevenness visibility (ME value) also vary by the color group to which a color indicating the maximum chroma Cmax (the maximum chroma in the entire uneven-color region) belongs. In other words, as illustrated in FIG. 4B, in a case in which a color belonging to the color group corresponding to red (R)-based, orange (O)-based and magenta (M)-based colors indicates a maximum chroma Cmax, the ME value (color-unevenness visibility) is higher than that in a case in which a color belonging to the color group corresponding to yellowish-green (YG)-based, green (G)-based and light-blue (LB)-based colors indicates a maximum chroma Cmax, when the respective values of these maximum chromas Cmax are the same.

Therefore, the image generation section 21 in the present embodiment calculates the chroma C, while performing the above-described correction processing that reflects variations in color-unevenness visibility from color to color. This realizes an objective color-unevenness inspection that more closely matches a sense of a human being, as compared to a case of the past in which a color-unevenness inspection is performed without reflecting variations in color-unevenness visibility from color to color.

Figure 5A:
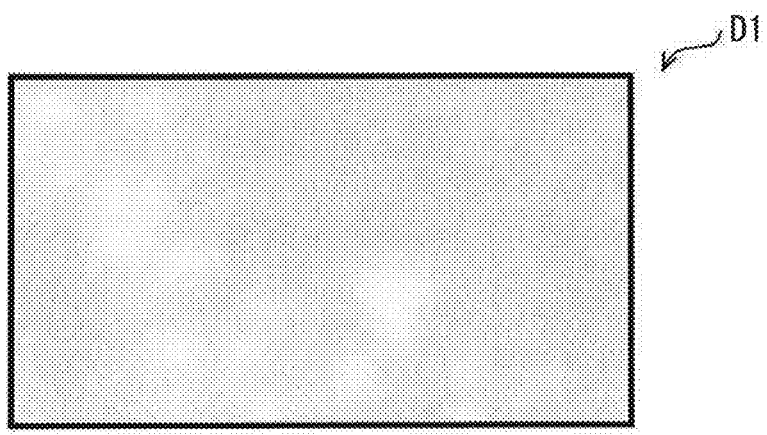
FIG. 5A and FIG. 5B are diagrams illustrating examples of an image created at the time of a color-unevenness inspection.

Next, by using the chroma C calculated in this way, the image generation section 21 generates an uneven-color image from the picked-up image described above (step S106). In other words, the image generation section 21 generates the uneven-color image formed by values each representing the chroma C of each display pixel. As a result, for example, an uneven-color image formed by uneven-color image data D1 as shown in FIG. 5A is generated.

Figure 5B:
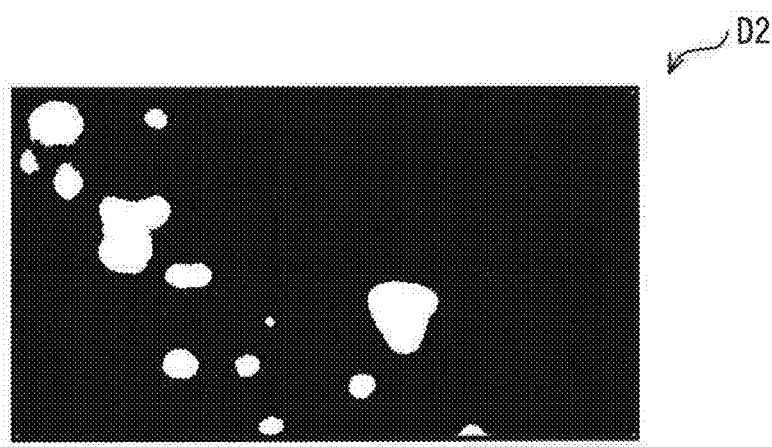

Subsequently, the image generation section 21 identifies, in the generated uneven-color image (uneven-color image data D1), an uneven-color region based on the magnitude of the chroma C in each display pixel (step S107). Specifically, the image generation section 21 identifies the uneven-color region by determining, for each display pixel whose value representing the chroma C is equal to or above a predetermined threshold, that the display pixel belongs to the uneven-color region, while determining, for each display pixel whose value representing the chroma C is less than the threshold, that the display pixel does not belong to the uneven-color region. As a result, for example, as shown in an uneven-color image (uneven-color image data D2) in FIG. 5B, the uneven-color region is identified. Incidentally, in the uneven-color image shown in FIG. 5B, the uneven-color region is displayed in white, while a region other than the uneven-color region is displayed in black, i.e. this is a binarized image.

Next, based on the uneven-color image (uneven-color image data D2) generated in this way, the parameter calculation section 22 calculates the uneven-color area ratio S (step S108) and also calculates the maximum chroma Cmax (step S108). Incidentally, the uneven-color area ratio S is the area ratio of the uneven-color region to the entire region of the inspection target (all the display pixel regions within the display screen).

Subsequently, based on the uneven-color area ratio S and the maximum chroma Cmax calculated in this way, by using, for example, the following equation (6), the inspection processing section 23 calculates the color-unevenness comprehensive evaluation value E (comprehensive evaluation value) to be used in the color-unevenness inspection (step S110). In other words, through weighting and addition of the uneven-color area ratio S and the maximum chroma Cmax, the color-unevenness comprehensive evaluation value E is calculated. As a result, in the color-unevenness inspection that will be described below, it is possible to perform the inspection in which the weighting of the uneven-color area ratio S and the maximum chroma Cmax is reflected. Incidentally, each of constants k1 and k2 in the equation (6) represents a weighting coefficient.

$$E=(k1 \times S + k2 \times C\text{max}) \quad (6)$$

Next, based on the color-unevenness comprehensive evaluation value E thus determined, the inspection processing section 23 performs the color-unevenness inspection for the display screen of the display device 4 serving as the inspection target, thereby generating the inspection result data Dout as a result of the inspection (step S111). Specifically, for example, it is determined that the larger the color-unevenness comprehensive evaluation value E, the larger the degree of color unevenness in the inspection target, while it is determined that the smaller the color-unevenness comprehensive evaluation value E, the smaller the degree of color unevenness in the inspection target. Alternatively, it is determined that when the color-unevenness comprehensive evaluation value E is equal to or above a predetermined threshold, the inspection target is defective, while it is determined that when the color-unevenness comprehensive evaluation value E is less than the predetermined threshold, the inspection target is not defective. This completes the color-unevenness inspection processing by the image processing device 2.

EXAMPLE

Figure 6:
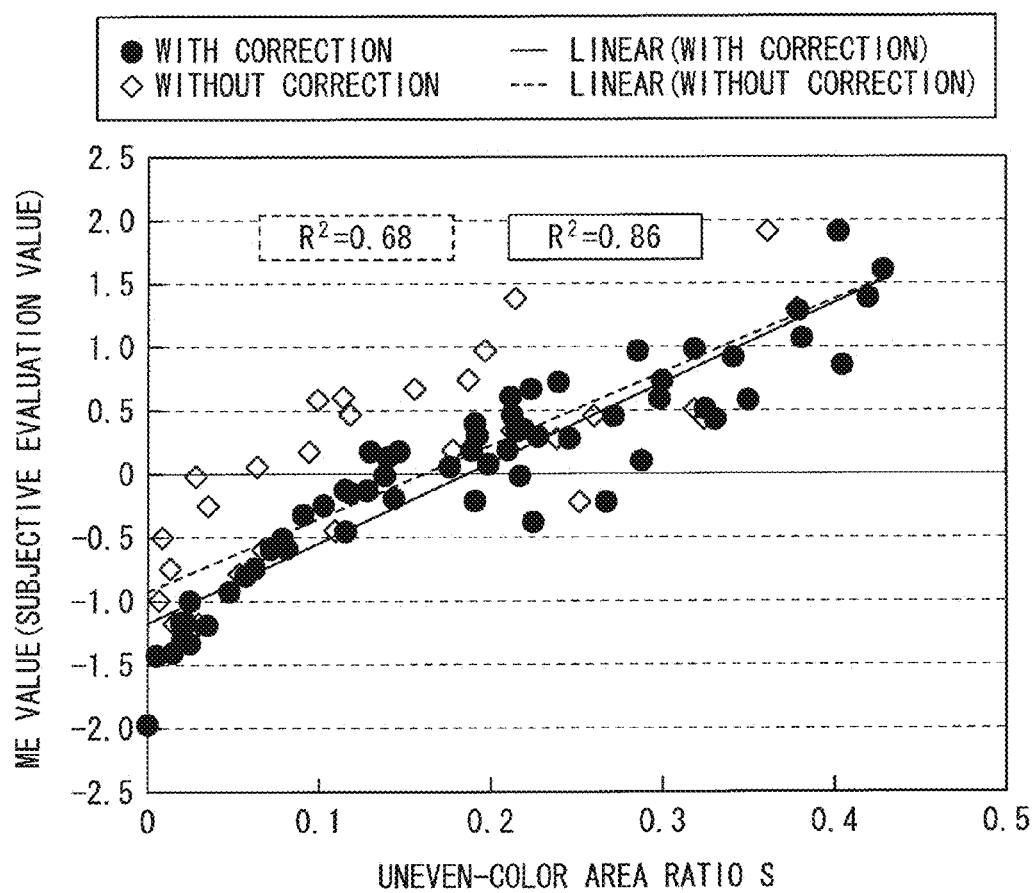
FIG. 6 is a characteristic diagram representing an example of the relation between the uneven-color area ratio and the subjective evaluation value of color unevenness.
Figure 7:
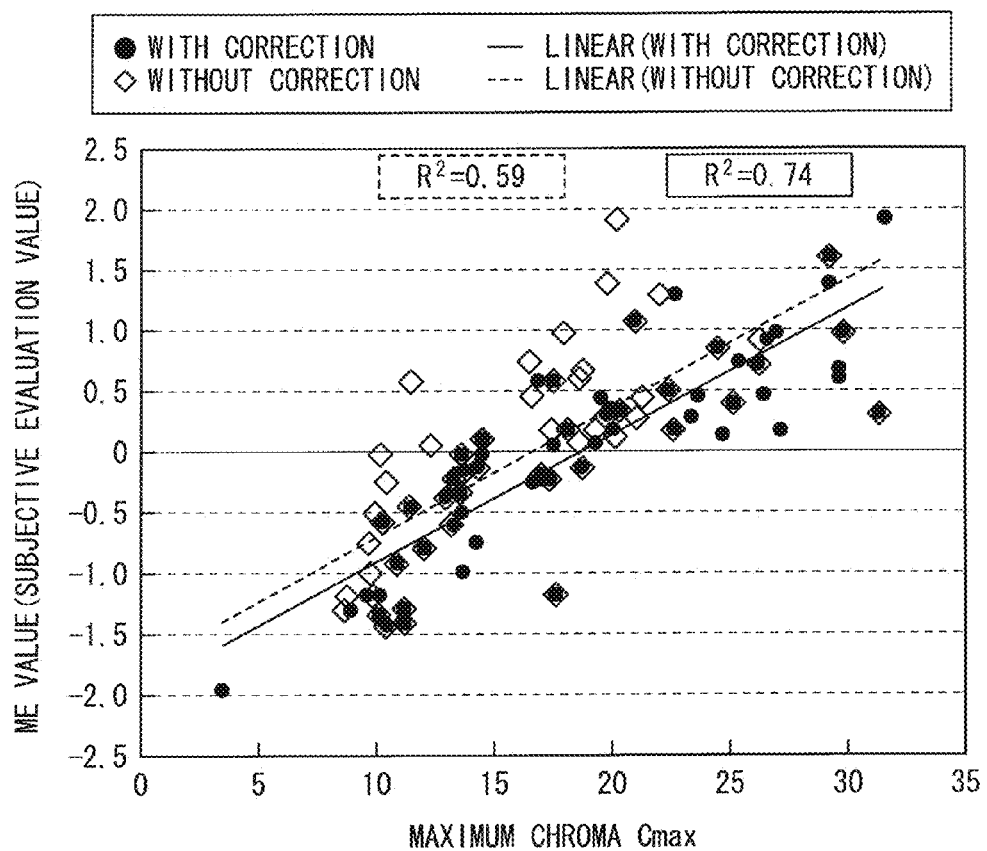
FIG. 7 is a characteristic diagram representing an example of the relation between the maximum chroma and the subjective evaluation value of color unevenness.

Here, FIG. 6 illustrates an example showing the relation between the uneven-color area ratio S and the subjective evaluation value (ME value) of color unevenness, together with a comparative example (example of the past). Further, FIG. 7 illustrates an example showing the relation between the maximum chroma Cmax and the subjective evaluation value (ME value) of color unevenness, together with a comparative example (example of the past). In these figures, data indicated by "WITH CORRECTION" is data corresponding to the example of the above-described embodiment (the gain correction processing is performed), whereas data indicated by "WITHOUT CORRECTION" is data corresponding to the comparative example (the gain correction processing is not performed).

As illustrated in FIG. 6 and FIG. 7, the value of a determination coefficient $R^2$ in a linear straight line in the example (with the correction) is larger (a value closer to "1") than that in the comparative example (without the correction). Incidentally, this determination coefficient $R^2$ indicates that the larger i.e. the closer to "1" the value is, the higher the precision of the color-unevenness inspection becomes. Specifically, in the property of the ME value in a case in which the uneven-color area ratio S illustrated in FIG. 6 is changed, the determination coefficient $R^2$ is 0.68 in the comparative example (without the correction), whereas the determination coefficient $R^2$ is 0.86 in the example (with the correction). On the other hand, in the property of the ME value in a case in which the maximum chroma Cmax illustrated in FIG. 7 is changed, the determination coefficient $R^2$ is 0.59 in the comparative example (without the correction), whereas the determination coefficient $R^2$ is 0.74 in the example (with the correction). In other words, it is apparent that in either of the case in which the uneven-color area ratio S is changed and the case in which the maximum chroma Cmax is changed, the precision of the color-unevenness inspection in the example (with the correction) is higher than that in the comparative example (without the correction). Thus, it is apparent that in the example, as compared to the comparative example (example of the past) in which the color-unevenness inspection is performed without reflecting variations in color-unevenness visibility from color to color, there is realized an objective color-unevenness inspection that more closely matches a sense of a human being.

Figures 8A, 8B, 8C, 8D:
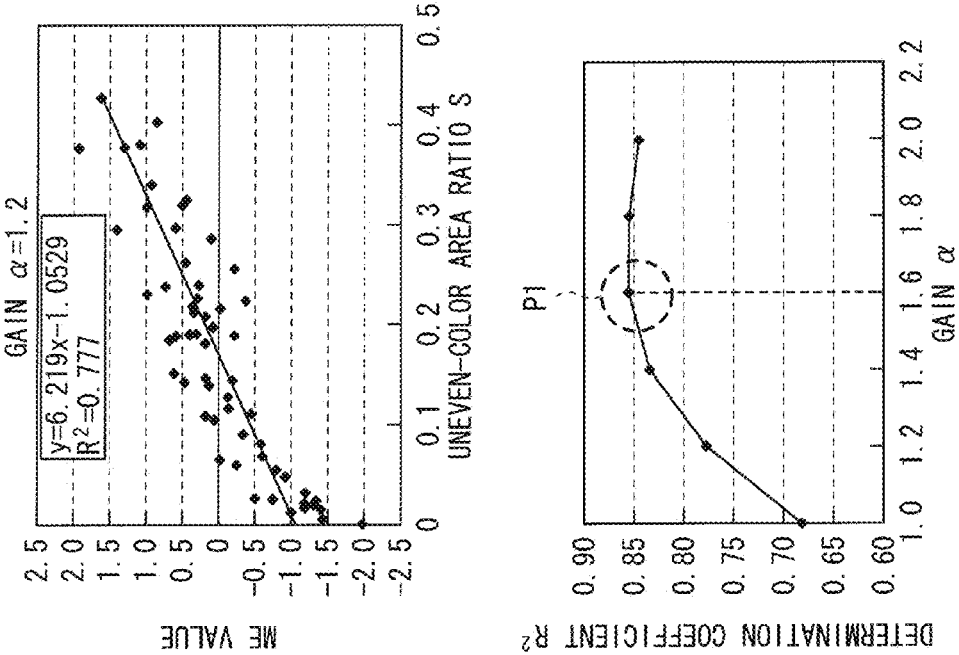
FIG. 8A through FIG. 8D are characteristic diagrams illustrating examples of the relation between a gain and a determination coefficient in the uneven-color area ratio.
Figure 9A:
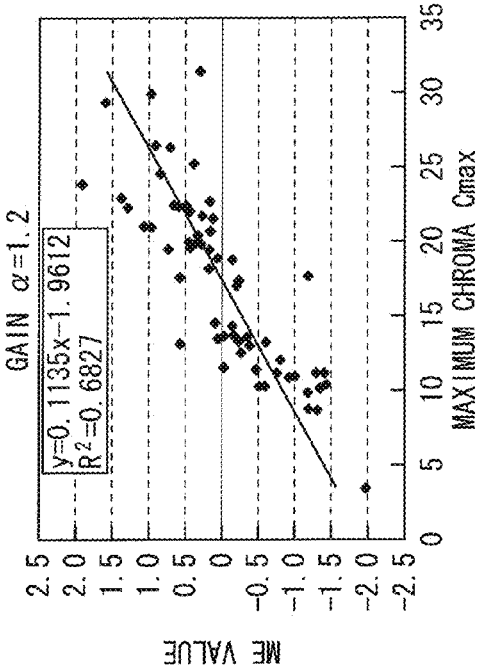
FIG. 9A through FIG. 9D are characteristic diagrams illustrating examples of the relation between the gain and the determination coefficient in the maximum chroma.
Figure 9B:
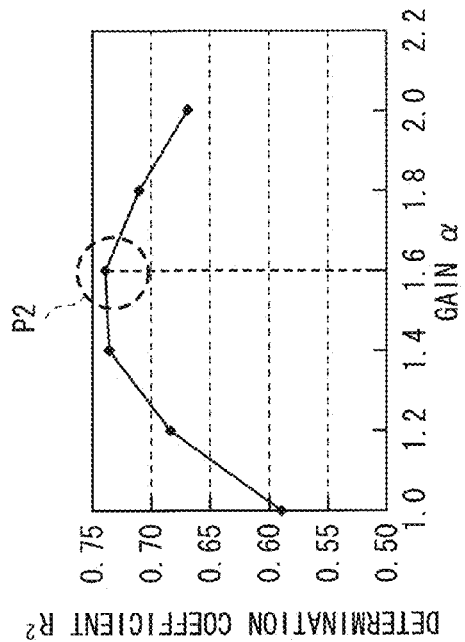
Figure 9C:
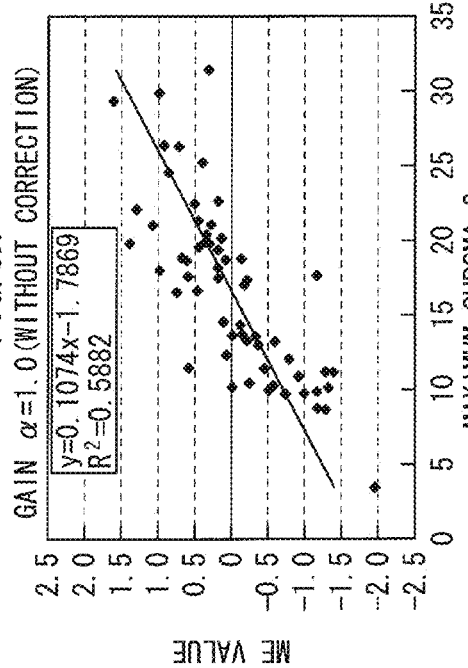
Figure 9D:
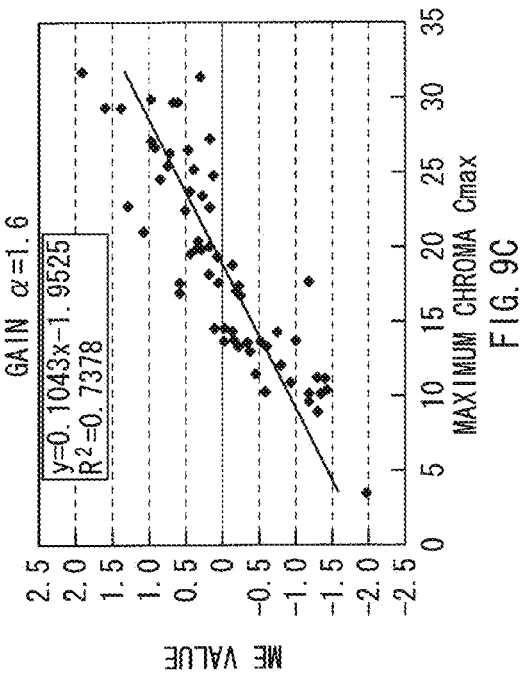

Next, FIG. 8A through FIG. 8D illustrate examples of the relation between the gain α and the determination coefficient $R^2$ in the uneven-color area ratio S. Specifically, FIG. 8A through FIG. 8C illustrate examples of the relation between the uneven-color area ratio S and the ME value, where the gain α=1.0 (corresponding to a case where the gain correction processing is not performed), 1.2 and 1.6, respectively, and FIG. 8D illustrates the determination coefficients $R^2$ in the uneven-color area ratio S collectively in a case where the value of the gain α is changed from 1.0 to 2.2. Similarly, FIG. 9A through FIG. 9D illustrate examples of the relation between the gain α and the determination coefficient $R^2$ in the maximum chroma Cmax. Specifically, FIG. 9A through FIG. 9C illustrate examples of the relation between the maximum chroma Cmax and the ME value, where the gain α=1.0 (corresponding to a case where the correction is not performed), 1.2 and 1.6, respectively, and FIG. 9D illustrates the determination coefficients $R^2$ in the maximum chroma Cmax collectively in a case where the value of the gain α is changed from 1.0 to 2.2.

It is apparent from FIG. 8A through FIG. 9D that as the value of the gain α increases, the value of the determination coefficient $R^2$ increases up to a certain value (here, α=1.6) and thereafter, the value of the determination coefficient $R^2$ decreases with the increase of the gain α. In other words, it is apparent that the determination coefficient $R^2$ has a maximum value with respect to the change of the gain α (see a sign P1 in FIG. 8D and a sign P2 in FIG. 9D). Therefore, it may be said that it is desirable to set the value of the gain α so that the determination coefficient $R^2$ becomes a value near the maximum value when the gain correction processing of the present embodiment is performed.

In the present embodiment as described above, in the picked-up image (picked-up-image data Din) of the inspection target in the color-unevenness inspection, the uneven-color image (uneven-color image data D2) is generated by calculating the maximum chroma Cmax in each display pixel and identifying the uneven-color region based on the magnitude of the calculated maximum chroma Cmax. At the time, the maximum chroma Cmax is calculated while the correction processing (the gain correction processing for a*) that reflects variations in color-unevenness visibility from color to color is performed in each display pixel of the picked-up image. Therefore, it is possible to realize an objective color-unevenness inspection that more closely matches a sense of a human being, than those in the past. Accordingly, it is possible to perform a color-unevenness inspection more appropriate than those in the past.

Further, since the objective color-unevenness inspection that more closely matches the sense of a human being is realized, it is possible to improve the efficiency of development and design, by using the inspection for quality evaluation in development and design stages.

Furthermore, by introducing the color-unevenness inspection of the present embodiment in, for example, an inspection process in mass production of products, it is possible to perform a stable and swift color-unevenness inspection, enabling improvement in efficiency of the inspection process and stabilization of product quality.

<2. Modification>

The present invention has been described above by using the embodiment, but the present invention is not limited to this embodiment and can be modified in various ways.

For example, in the foregoing embodiment, there has been described the case where the uneven-color area ratio S and the maximum chroma Cmax are employed as the evaluation parameter used in the color-unevenness inspection. However, in addition to (or in place of) them, other evaluation parameter may be used.

Further, in the foregoing embodiment, there has been described the case where the inspection target of the color-unevenness inspection is the display screen of the display device that displays a color image. However, the inspection target according to the embodiment of the present invention may be any device (for example, a lighting device (a backlight or the like) capable of emitting color light) other than the display device.

Moreover, in the forgoing embodiment, there has been described the case where the image pickup device 3 and the image processing device 2 are separate from each other in the color-unevenness inspection apparatus 1. However, these devices may be provided within the same device.

In addition, the series of processes described in the present embodiment may be performed in hardware (circuit) or software (program).

The present application contains subject matter related to that disclosed in Japanese Priority Patent Application JP 2010-046779 filed in the Japan Patent Office on Mar. 3, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A color-unevenness inspection apparatus comprising:
   an image pickup section to pick up an image of an inspection target in a color-unevenness inspection;
   an image generation section to generate an uneven-color image by, in the picked-up image of the inspection target obtained by the image pickup section, calculating a chroma in each unit region and identifying an uneven-color region based at least in part on a magnitude of the calculated chroma;
   a calculation section to calculate, for the uneven-color region in the uneven-color image, an evaluation parameter to be used in the color-unevenness inspection; and
   an inspection section to perform the color-unevenness inspection based at least in part on the calculated evaluation parameter,
   wherein the image generation section calculates the chroma, in each unit region of the picked-up image, while performing correction processing that reflects variations in color-unevenness visibility from color to color,
   wherein as the evaluation parameter, the color-unevenness inspection apparatus uses an uneven-color area ratio that is an area ratio of an uneven-color region to an entire region of the inspection target, and a maximum chroma in an entire region of the uneven-color region.

2. The color-unevenness inspection apparatus according to claim 1, wherein the image generation section calculates values (a*, b*) in a CIELAB color space, in each unit region of the picked-up image, and
   the image generation section performs, as correction processing that reflects variations in color-unevenness visibility from color to color, gain correction processing expressed by equation (1) on the calculated value a*, and calculates a chroma C by using equation (2):

$$a^{*\prime}=(\alpha \times a^*) \text{ (when } a^*>0\text{:gain } \alpha>1\text{, when } a^* \leq 0\text{:gain } \alpha=1) \quad (1)$$

$$C=\{(a^{*\prime})^2+(b^*)^2\}^{1/2} \quad (2).$$

3. The color-unevenness inspection apparatus according to claim 1, wherein the inspection section performs the color-unevenness inspection based at least in part on a comprehensive evaluation value obtained through weighting and addition of the uneven-color area ratio and a maximum chroma.

4. The color-unevenness inspection apparatus according to claim 3, wherein the inspection section determines that the larger the comprehensive evaluation value, the larger a degree of color unevenness in the inspection target, and the smaller the comprehensive evaluation value, the smaller the degree of color unevenness in the inspection target.

5. The color-unevenness inspection apparatus according to claim 2, wherein the inspection target is a display screen in a display device that displays a color image.

\* \* \* \* \*